US007653906B2

(12) United States Patent
Chen et al.

(10) Patent No.: US 7,653,906 B2
(45) Date of Patent: Jan. 26, 2010

(54) APPARATUS AND METHOD FOR REDUCING POWER CONSUMPTION ON SIMULTANEOUS MULTI-THREADING SYSTEMS

(75) Inventors: Yen-Kuang Chen, Sunnyvale, CA (US); Ishmael F. Santos, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 10/279,630

(22) Filed: Oct. 23, 2002

(65) Prior Publication Data

US 2004/0083478 A1 Apr. 29, 2004

(51) Int. Cl.
G06F 9/46 (2006.01)
G06F 7/38 (2006.01)
G06F 9/40 (2006.01)

(52) U.S. Cl. .................. 718/101; 718/102; 718/103; 712/216; 712/217; 712/220

(58) Field of Classification Search ......... 718/100–108; 709/207, 226; 711/137; 712/220–240, 216–217
See application file for complete search history.

(56) References Cited

U.S. PATENT DOCUMENTS

| 4,430,707 | A | * | 2/1984 | Kim ........................... 718/100 |
| 4,493,020 | A | * | 1/1985 | Kim et al. ................... 712/217 |
| 4,908,750 | A | * | 3/1990 | Jablow ....................... 718/103 |
| 5,133,077 | A | * | 7/1992 | Karne et al. .................. 712/23 |
| 5,339,415 | A | * | 8/1994 | Strout et al. ................ 718/102 |
| 5,420,808 | A | * | 5/1995 | Alexander et al. .......... 713/321 |
| 5,539,681 | A | * | 7/1996 | Alexander et al. .......... 713/321 |
| 5,553,256 | A | * | 9/1996 | Fetterman et al. .......... 712/217 |
| 5,627,984 | A | * | 5/1997 | Gupta et al. ................ 712/200 |
| 5,781,775 | A | * | 7/1998 | Ueno ........................ 718/102 |
| 5,790,826 | A | * | 8/1998 | Thusoo et al. .............. 712/216 |
| 5,828,895 | A | * | 10/1998 | Chan et al. .................. 712/23 |
| 5,841,999 | A | * | 11/1998 | Le et al. .................... 712/217 |
| 5,872,972 | A | * | 2/1999 | Boland et al. .............. 718/102 |
| 6,101,597 | A | * | 8/2000 | Colwell et al. ............. 712/218 |
| 6,163,838 | A | * | 12/2000 | Merchant et al. .......... 712/219 |
| 6,212,544 | B1 | * | 4/2001 | Borkenhagen et al. ..... 718/103 |
| 6,272,520 | B1 | * | 8/2001 | Sharangpani et al. ...... 718/108 |
| 6,345,287 | B1 | * | 2/2002 | Fong et al. ................. 718/102 |
| 6,356,918 | B1 | * | 3/2002 | Chuang et al. ............. 707/203 |
| 6,385,715 | B1 | * | 5/2002 | Merchant et al. .......... 712/219 |
| 6,393,550 | B1 | * | 5/2002 | Fetterman et al. .......... 712/214 |
| 6,493,741 | B1 | * | 12/2002 | Emer et al. ................ 718/107 |
| 6,505,250 | B2 | * | 1/2003 | Freund et al. .............. 709/226 |

(Continued)

OTHER PUBLICATIONS

Intel, "Hyper-Threading Technology", Intel Technology Journal, vol. 06, Issue 01, Feb. 14, 2002, ISSN 1535766X, pp. 1-66.*

(Continued)

Primary Examiner—Meng-Ai An
Assistant Examiner—Jennifer N To
(74) Attorney, Agent, or Firm—Blakely, Sokoloff, Taylor & Zafman LLP

(57) ABSTRACT

Activities may be delayed from being dispatched until another activity is ready to be dispatched. Dispatching more than activities increase overlapping in execution time of activities. By delaying the dispatch of the activities, power consumption and thermal dissipation on a multi-threading processor may be reduced.

17 Claims, 4 Drawing Sheets

U.S. PATENT DOCUMENTS

| | | | |
|---|---|---|---|
| 6,567,840 B1* | 5/2003 | Binns et al. | 718/103 |
| 6,647,408 B1* | 11/2003 | Ricart et al. | 718/105 |
| 6,662,203 B1* | 12/2003 | Kling et al. | 718/103 |
| 6,675,190 B1* | 1/2004 | Schabernack et al. | 718/102 |
| 6,839,833 B1* | 1/2005 | Hartnett et al. | 712/229 |
| 6,848,029 B2* | 1/2005 | Coldewey | 711/137 |
| 6,952,825 B1* | 10/2005 | Cockx et al. | 718/102 |
| 6,952,827 B1* | 10/2005 | Alverson et al. | 718/104 |
| 7,213,135 B2* | 5/2007 | Burky et al. | 712/244 |
| 7,376,844 B2* | 5/2008 | Feyt | 713/194 |
| 2003/0041090 A1* | 2/2003 | Armstrong et al. | 709/106 |
| 2003/0110230 A1* | 6/2003 | Holdsworth et al. | 709/207 |
| 2004/0073769 A1 | 4/2004 | Debes et al. | |
| 2005/0149936 A1* | 7/2005 | Pilkington | 718/102 |

OTHER PUBLICATIONS

Tsai et al, "The Supperthreaded Processor Architecture", www.cs.umn.edu/research/agassiz, 2000, pp. 1-40.*

Burges, Christohpher J.C., "A Tutorial on Support Vector Machines for Pattern Recognition", Data Mining and Kowledge Discovery, 2, 121-167(1998).

Emer, Joel, "Simultaneous Multithreading: Multiplying Alpha Performance", Compaq Better Answers, www.compaq.com, In Microprocessor Forum, Oct. 1999.

Delaluz, V. et al., "DRAM Energy Management Using Software and Hardware Directed . . . ", in Proc. of Int. Symp. on High Performance Computer Architecture, pp. 159-169, Jan. 2001.

Diefendorff, Keith, "Compaq Chooses SMT for Alppha: Simultaneous Multithreading Explits Instruction-and Thread-Level . . . ", Micropocessor Report, vol. 13, No. 16, Dec. 6, 1999.

Diefendorff, Keith, "Power4 Focuses on Memory Bandwidth: IBM Confornts IA-64, Says ISA Not Important", Microdesign Resources, Oct. 6, 1999, pp. 11-18.

Emer, Joel, "Simultaneous Multithreading: Multiplying Alpha Performance", Compaq Better Answers, www.compaq.com, In Microprocessor Forum, Oct. 1999.

Flaunter, Krisztian, "Automatic Monitoring for Interactive Performance and Power Reduction", Ph.D. dissertation, The University of Michigan, 2001, pp. 1-89.

Gunther, Stephen H., et al., "Managing the Impact of Increasing Microprocessor Power Consumption", Intel Technology Journal Q1, 2001, pp. 1-9.

Gwennap, Linley, "MAJC Gives VLIW a New Twist: New Sun Instruction Set Is Powerful But Simpler . . . ", Microdesign Resources, Sep. 13, 1999, vol. 13, No. 12, pp. 12-22.

Haskell, Barry G., et al. "Digital Video: An Introduction to MPEG-2", International Thomson Publishing, Copyright 1997.

Hinton, Glenn, et al., "The Microarchitecture of the Pentium 4 Processor", Intel Technology Journal Q1, 2001, pp. 1-13.

Kaxiras. Stefanos, et al., "Comparing Power Consumption . . . ", in Proc. of Int'l Conf. on Compilers, Architectures and Synthesis for Embedded Systems, pp. 211-220, Nov. 2001.

Lebeck, Alvin R., et al., "Power Aware Page Allocation", in Proc. of Int. Conf. on Architectural Support Programming Languages Operating System, Nov. 2000, pp. 105-116.

Lo, Jack L., et al., "Tuning Compiler Optimizations for Simultaneous Multithreading", In Proc. of Int'l Symp. on Microarchitecture, pp. 114-124, 1997.

Lorch, Jacob R. et al., "Scheduling Techniques for Reducing Processor Energy Use in MacOS", Wireless Networks, vol. 3, No. 5, pp. 311-324, 1997.

Marr, Deborah T. et al., "Hyper-Threading Technology Architecture and Microarchitecture", Intel Technology Journal Q1, 2002.

Seng, John S., et al., "Power-Sensitive Multithreaded Architecture", in Proc. of Int'l Conf. on Computer Design, pp. 199-208, 2000.

Shin, Youngsoo, et al., "Power Conscious Fixed Priority Scheduling for Hard REal-Time Systems", in Proc. of Design Automation Conf., pp. 134-139, Jun. 1999.

Snavely, Allan et al., "Symbiotic Jobscheduling for a . . . ", in Proc. of Int. Conf. on Architectural Support for Programming Languages & Operating Systems, pp. 234-244, Nov. 2000.

Tremblay, Marc, "Microprocessor Architecture for Java Computing", Sun Microsystems Inc., Hotchips '99.

Tullsen, Dean M., et al., "Simultaneous Multithreading: Maximizing on-Chip Parallelism", in Proc. of Int'l Symp. on Computer Architecture, pp. 392-403, Jun. 1995.

Wang, Hong, "Speculative Precomputation: Exploring the Use of Multithreading for Latency", Intel Technology Journal Q1 2002, vol. 6, Issue 1.

Weiser, Mark et al., "Scheduling for Reduced CPU Energy", in Proc. of Symp. on Operating System Design Implementation, pp. 13-23, Nov. 1994.

Yao, Frances, et al., "A Scheduling Model for Reduced CPU Energy", in IEEE Annual Foundations of Computer Science, pp. 374-382, Oct. 1995.

Zaccarin, Andre, "Dynamic Voltage Management for Energy-Efficient Data Streaming . . . ", internal technical report, Microprocessor Research Labs, Intel Corporation, Oct. 2001.

Intel Performance Libraries, Intel Corporation.

Intel Pentium 4 and Intel Xeon Processor Optimization Reference Manual, Intel Corporation.

Debes, Eric, et al, "Computational Analysis and System Implications of Video Watermarking Applications," Proceedings of SPIE vol. 4675 (2002), pp. 470-477.

* cited by examiner

APPARATUS AND METHOD FOR REDUCING POWER CONSUMPTION ON SIMULTANEOUS MULTI-THREADING SYSTEMS

FIELD OF THE INVENTION

The present invention relates to the field of computer systems, more particularly relating to methods and apparatuses for scheduling activities.

BACKGROUND

Multi-threading is a technique that split instructions into multiple streams of executions (or threads) so that they can be processed in parallel. FIG. 1A is a block diagram illustrating an example of a prior art system that can be used to support multi-threading. The system 100 includes two physical processors 105 and 110 and may be used to execute multi-threaded software applications. Each of the physical processors 105 and 110 includes a similar set of resources (e.g., architecture states, execution resources, caches, etc.). The two physical processors may share a common system bus 115 and a common main memory 120. Typically, to increase parallelism, the system 100 may employ a scheduling technique that dispatch a thread whenever the thread is ready to be dispatched.

Hyper-Threading Technology is a technology from Intel® Corporation of Santa Clara, Calif. that enables execution of threads in parallel using a single processor. Hyper-Threading Technology is a form of simultaneous multi-threading technology (SMT) where multiple threads of software applications can be executed simultaneously on one processor. This is achieved by duplicating the architectural state, with each architecture state sharing one set of processor execution resources.

FIG. 1B is a block diagram illustrating an example of a prior art system with a single processor supporting Hyper-Threading Technology. The system 101 includes a physical processor 150 having two architecture states 185 and 190 to make the physical processor 150 to be perceived as two logical processors 155 and 160. The two logical processors 155 and 160 share the same execution resources 165, caches 170, system bus 175 and main memory 180. The physical processor 150 schedules the threads in interleaved fashion depending on which of the logical processors 155 and 160 is available. Hyper-Threading Technology results in increased utilization of processor execution resources 165 and overall throughput. Hyper-Threading Technology makes the execution units busier and thus the execution units may consume slightly more power in comparison with a processor not supporting Hyper-Threading Technology.

In addition to throughput, power consumption is becoming an important consideration for modern systems. This is especially true for battery-run mobile systems, in which the average power consumption for a given fixed application is a crucial parameter to consider for the evaluation of the overall performance of the system. This is also true for other systems such as, for example server systems, because the cost to provide energy to the cluster is a concern for the service providers. Today, most of the energy saving are done via dynamic voltage/frequency scaling.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method for scheduling activities is disclosed. A ready-to-be-dispatched activity is dispatched if there is another activity running. If there is no other activity running, a ready-to-be-dispatched activity may be delayed until another activity is ready to be dispatched so that both activities are dispatched together.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

In the following description, an application may include one or more threads. A thread may include one or more activities (or segments), and activities from two or more threads may run in parallel. Although the description refers to scheduling activities, the techniques described may also be used to schedule threads, processes, tasks, segments of processes, segments of tasks, etc. For example, the techniques may be used to schedule threads using a processor supporting Hyper Threading technology.

In multi-threaded architectures, most schedulers are designed for maximum throughput where activities are dispatched immediately after they are ready-to-be-dispatched so that they can finish as fast as possible. This generally works well for throughput-oriented tasks, and any delay in dispatching the activities may be viewed as possibly impacting performance. In a typical activity scheduling scheme, when one activity finishes its work, that activity puts its data into a buffer for a next activity to work on. For example, a real-time video application may include one activity to capture the video, one activity to encode the bit stream, and another activity to send out the bit stream. These activities have been naturally synchronized by the video-frame and the bit-stream buffers. Normally, when the input data is ready the next activity will immediately work on the data. The same activity may be dispatched repeatedly at different times. A period between a time when an activity is dispatched and a next time the same activity is dispatched is referred to as a cycle period. Depending on the application, the cycle period may be small or large. When the cycle period is small, there may be some overlapping in the execution time.

Figure 1A:
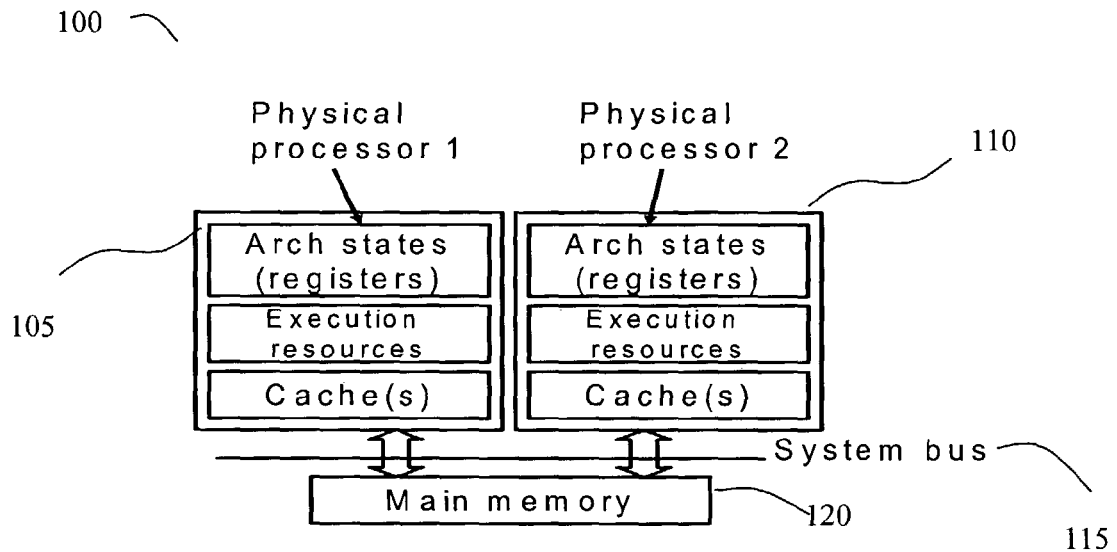
FIG. 1A is a block diagram illustrating an example of a prior art system that can be used to support multi-threading.
Figure 1B:
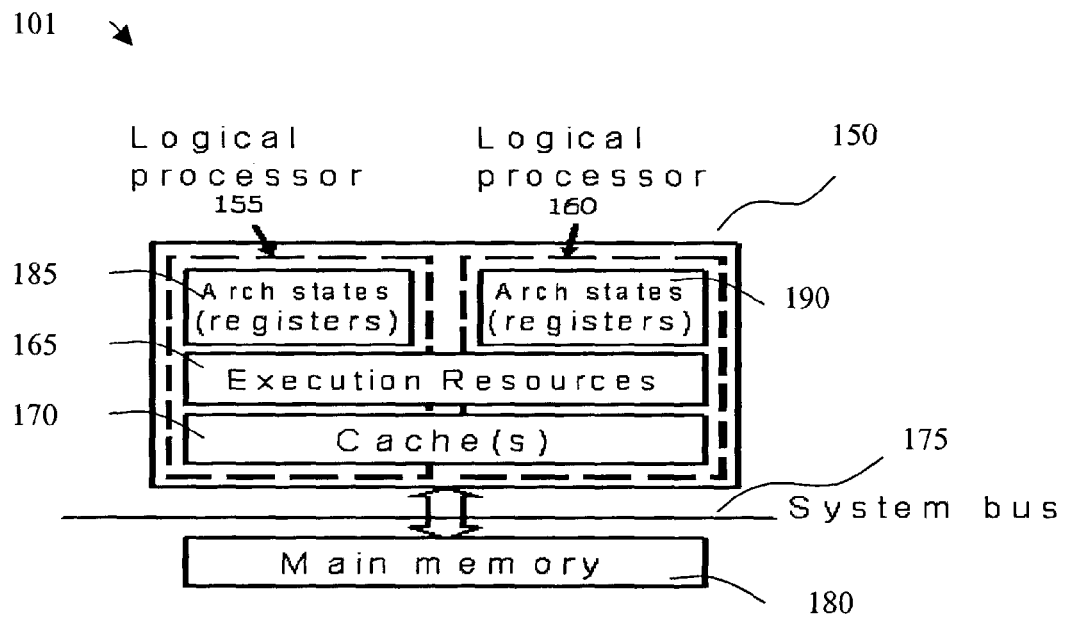
FIG. 1B is a block diagram illustrating an example of a prior art system with a single processor supporting Hyper-Threading Technology.
Figures 2A, 2B:
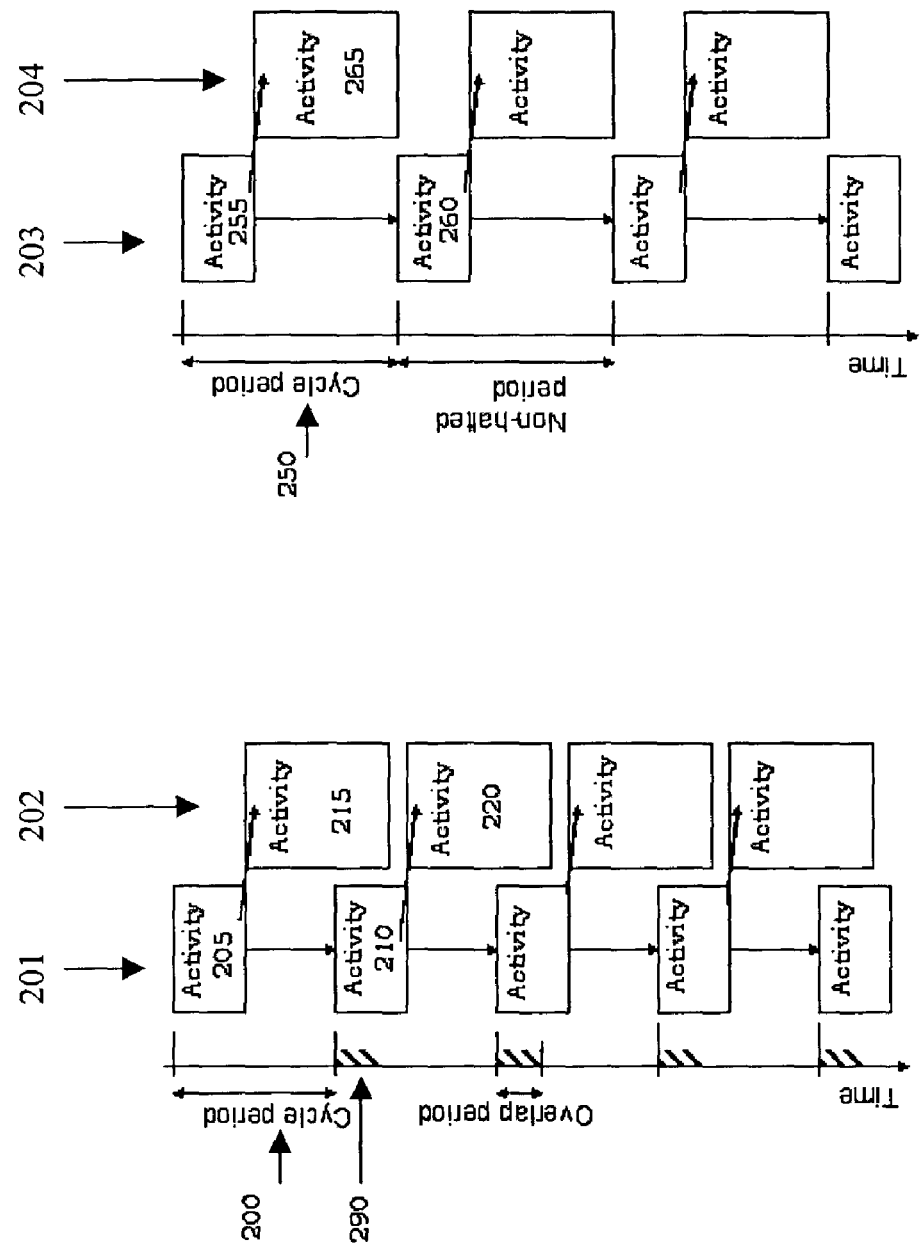
FIG. 2A is a block diagram illustrating an example of an activity-scheduling scheme with overlapping period.
FIG. 2B is a block diagram illustrating another example of an activity-scheduling scheme without any overlapping period.

FIG. 2A is a block diagram illustrating an example of an activity-scheduling scheme with overlapping period. The diagram illustrates two threads 201 and 202, with each thread having multiple activities or segments. For example, the thread 201 includes the activities 205 and 210, and the thread 202 includes the activity 215. In this example, the activities in the first thread 201 are dispatched periodically. Activities (including activity 215) in the second thread 202 are dispatched immediately after the activities from the first thread 201 finishes. The two activities 205 and 210 are from the same thread 201 but are dispatched at different time. The cycle period 200 between the two activities 205 and 210 is small as compared to the combined execution times of the activity 205 and the activity 215. As such, there is overlap in execution between the activity 210 and the activity 215. In this example, the activity 215 may need to wait for the completion of the activity 205 before it is ready to be dispatched. This may be because execution of the activity 215 depends on completion and output of the activity 205. The activity 210, however, may not depend on completion of the activity 215, and therefore may be dispatched before the completion of the activity 215. Note that this may cause the execution of the activity 210 to overlap with the execution of the activity 215, as indicated by the overlap time 290.

In the example illustrated in FIG. 2A, the activity 215 may be the only activity running until the time when the activity 210 is dispatched. Thus, when an SMT processor such as, for example, a processor supporting Hyper-Threading Technology is used, only one logical processor may be busy executing the activity 215 while the other logical processor may be idle or halted until the activity 210 is dispatched. At that time, the two logical processors may be busy executing the two activities 210 and 215 in parallel. The period when only the activity 215 is running is referred to as a single activity section of the application, and the period when the activity 215 is running in parallel with the activity 210 is referred to as a multi-thread section of the application. Because there are overlapping executions, the application may be completed sooner than if the application was running with a normal processor that runs one thread at a time.

When the cycle period is large, there may not be any overlap in executions among the activities. For example, as illustrated in FIG. 2B, the cycle period 250 between the two activities 255 and 260 is more than the execution time of the activity 265 and the activity 255. As such, there may be no overlap in execution between the activity 260 and the activity 265. In this example, the activity 265 may need to wait for the completion of the activity 255 before it is ready to be dispatched, but the activity 260 does not need to wait for the completion of the activity 265 to be dispatched. When there is no overlap in the execution of the activities, an SMT processor may behave as a normal processor, and the activities may be viewed as executing in serial.

Figure 3:
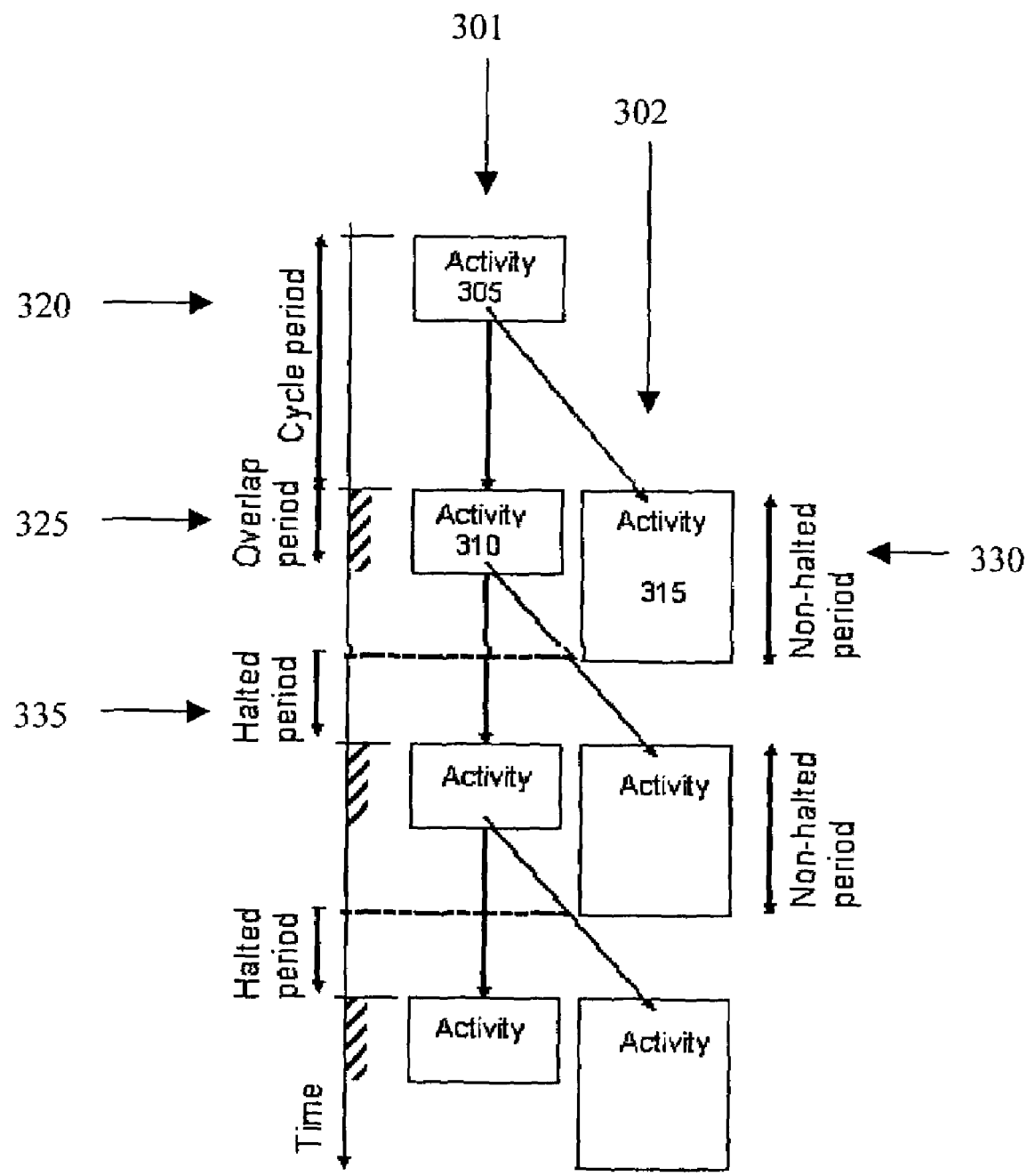
FIG. 3 is a block diagram illustrating an example of an activity scheduling scheme with a dispatch delay technique according to one embodiment.

FIG. 3 is a block diagram illustrating an example of an activity-scheduling scheme with a dispatch delay technique according to one embodiment. For one embodiment, overlap in running activities may be increased to reduce power consumption. This may be done even when the activities may not be explicitly specified to run in parallel with other activities. For one embodiment, to increase the overlap in execution, instead of dispatching activities immediately when they are ready to be dispatched, the activities are dispatched in a coordinated manner.

The diagram in FIG. 3 illustrates two threads 301 and 302. The thread 301 includes activities 305 and 310. The thread 302 includes activity 315. Referring to the activity 315 in the thread 302, even though this activity 315 may be ready to be dispatched at an earlier time, it may be delayed until the activity 310 is ready to be dispatched. By delaying, the activity 310 and the activity 315 may be dispatched such that there is overlap in their execution, as illustrated by the overlap period 325. It may be possible that the activity 315 may have to be delayed for one or more cycle periods before it can be dispatched.

The period when one or both of the activities 310 and 315 are running is referred to as a non-halted period 330. During the non-halted period 330, the processor may remain busy and consume power. Note that the non-halted period 330 also includes the overlap period 325.

By delaying the starting time or the dispatch of the activity 315, in addition to increasing the overlap period 325, a period of no execution is introduced. This period is referred to as a halted or idle period 335. For one embodiment, during the halted period 335, the processor may be less busy and therefore may consume less power. For example, when using a processor supporting Hyper-Threading Technology, because powering up additional execution units for two simultaneous threads is more economical and the processor consumes less power when it is halted (or when both logical processors are halted), less energy is consumed. Thus, it may be advantageous to overlap the busy cycles of one logical processor with those of the other logical processor.

Dispatching the activities (or threads, processes, tasks, etc.) in this coordinated manner may be done at different multiple levels. For example, at the application level, synchronization points may be hand-tuned so that the second activity may not wake up until the first activity is waken up. Following are two code examples that may be used to schedule activites in a real-time application. In the first code example, the second activity is waken up when the first activity finished, as is typically done:

```
void CALLBACK TimerProc(...)
{
    SetEvent(hEWakeUpFirstThread);
}
first_thread(...)
{
    while (...)
    {
        WaitForSingleObject (hEWakeUpFirstThread, INFINITE);
        ...
        SetEvent(hEWakeUpSecondThread);
    }
}
second_thread(...)
{
    while (...)
    {
        WaitForSingleObject(hEWakeUpSecondThread, INFINITE);
        ...
        SetEvent(hESecondThreadFinished);
    }
}
```

In the second code example, the second activity is not waken up when the first activity finishes its work. Instead, the second activity is waken up at the same time when the first activity is waken up by the external timer. In this example, the dispatch of the second activity is delayed.

```
void CALLBACK TimerProc(...)
{
    SetEvent(hEWakeUpFirstThread);
    SetEvent(hEWakeUpSecondThread);
}
first_thread(...)
{
    while (...)
```

-continued

```
    {
        WaitForSingleObject (hEWakeUpFirstThread, INFINITE);
        ...
    }
}
second_thread(...)
{
    while (...)
    {
        WaitForSingleObject(hEWakeUpSecondThread, INFINITE);
        ...
        SetEvent(hESecondThread Finished);
    } }
```

The second activity in the above code example may be delayed by being queued in a buffer. For one embodiment, a time-out scheme may be implemented such that a ready-to-be-dispatched but delayed activity may be dispatched. For example, the time-out scheme may include setting a predetermined maximum amount of delay by which an activity may be queued in the buffer before being dispatched. In another embodiment, activities may have different priorities and each priority may be associated with a different delay time before being dispatched.

For one embodiment, when real-time constraints of the activities and their schedules are known ahead of time, compilers and schedulers in a real-time operating system (OS) may schedule the activities using the same techniques described herein. Moreover, without prior knowledge of real-time scheduling of the task, an activity-dispatch buffer may be designed in the OS level or in the processor level. Similar to the "write combining" buffer in modern processors, when there is only one ready-to-be-dispatched activity in the system, the activity-dispatch buffer will delay dispatching it. When there is another activity ready to be dispatched, two activities will be dispatch simultaneously. In the Hyper-Threading Technology processor example, two logical processors may wake up at the same time. The activity-dispatch buffer may increase the overlap between the execution time of activities and thus increases the parallelism in the workloads.

Figure 4:
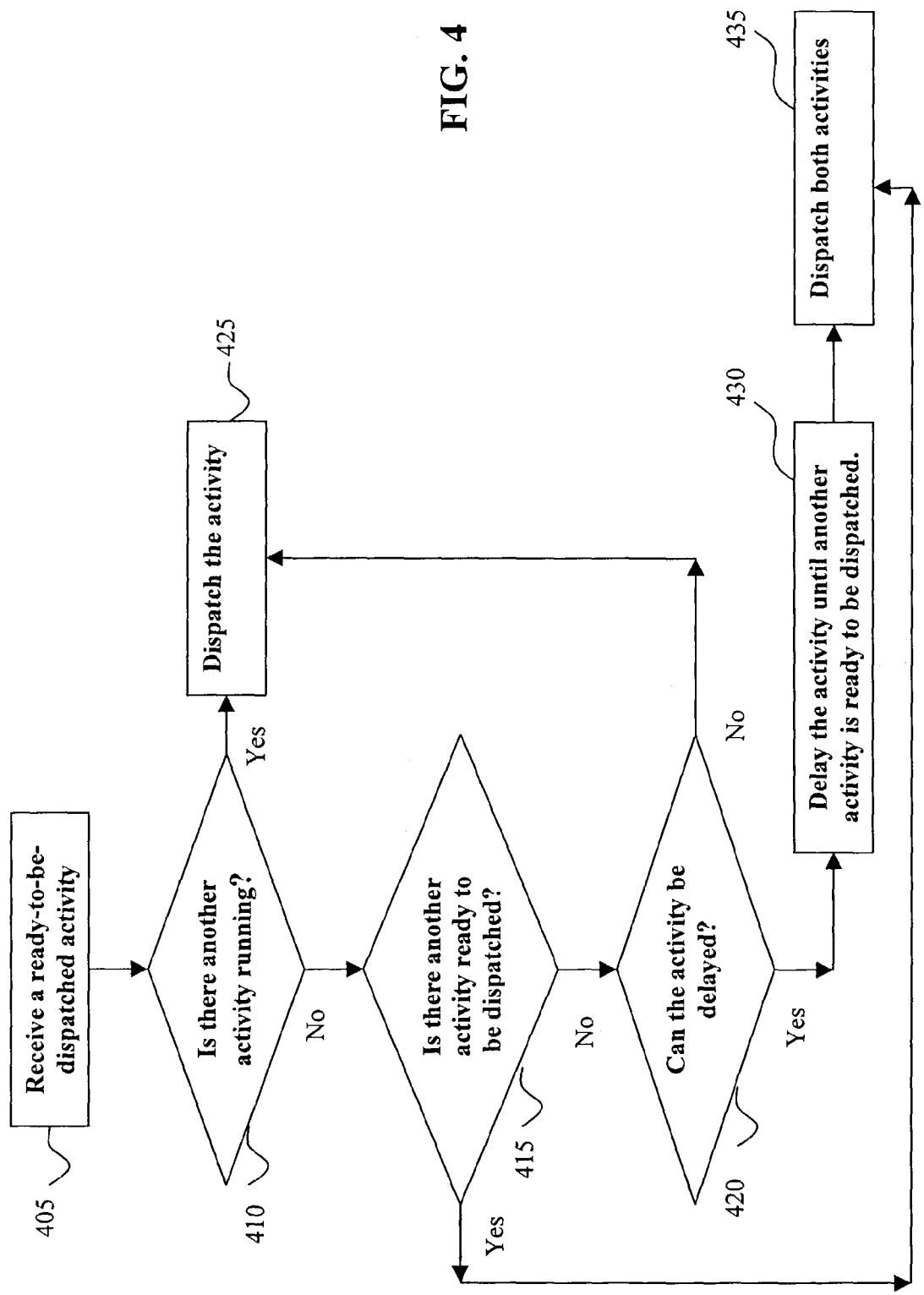
FIG. 4 is a flow diagram illustrating an example of an activity scheduling scheme according to one embodiment.

FIG. 4 is a flow diagram illustrating an example of an activity-scheduling scheme according to another embodiment. At block 405, a ready-to-be-dispatched activity is received by the scheduler. Instead of immediately dispatching the activity, the scheduler determines if another activity is currently running, as shown in block 410. If there is an activity running, the process moves from block 410 to block 425 where the scheduler dispatches the ready-to-be-dispatched activity. This may enable the two activities to run with some levels of overlap.

From block 410, when there is no other activity running, the process moves to block 415 where a test is made determine if there is another activity ready to be dispatched. If there is another activity ready to be dispatched, the process moves from block 415 to block 435 where both activities are dispatched to increase execution overlap.

From block 415, if there is not another activity ready to be dispatched, the process moves to block 420 where a test is made determine if the current ready-to-be-dispatched activity can be delayed. The activity may not be delayed, for example, because it may have been assigned a high priority and its dispatch and completion may be important to other activities. If the activity may not be delayed, the process moves from block 420 to block 425 where the activity is dispatched. In this example, the activity is dispatched even though it may be the only activity running.

From block 420, if the activity may be delayed, the process moves to block 430 where the dispatch of the activity is delayed until another ready-to-be-dispatched activity is received. When another ready-to-be-dispatched activity is received, the two activities are dispatched, as shown in block 435. In one embodiment, a delay period may be used to avoid excessive delay. For example, if another ready-to-be-dispatched activity is not received after the delay period, the activity may be dispatched by itself without additional delay.

The operations of these various methods may be implemented by a processor in a computer system, which executes sequences of computer program instructions that are stored in a memory which may be considered to be a machine-readable storage media. The memory may be random access memory, read only memory, a persistent storage memory, such as mass storage device or any combination of these devices. Execution of the sequences of instruction may cause the processor to perform operations according to the process described in FIG. 4, for example.

The instructions may be loaded into memory of the computer system from a storage device or from one or more other computer systems (e.g. a server computer system) over a network connection. The instructions may be stored concurrently in several storage devices (e.g. DRAM and a hard disk, such as virtual memory). Consequently, the execution of these instructions may be performed directly by the processor.

In other cases, the instructions may not be performed directly or they may not be directly executable by the processor. Under these circumstances, the executions may be executed by causing the processor to execute an interpreter that interprets the instructions, or by causing the processor to execute a compiler which converts the received instructions to instructions that which can be directly executed by the processor.

In other embodiments, hard-wired circuitry may be used in place of or in combination with software instructions to implement the present invention. Thus, the present invention is not limited to any specific combination of hardware circuitry and software, nor to any particular source for the instructions executed by the computer system.

Methods and systems for scheduling activities have been disclosed. Activities may be delayed to increase overlapping between the execution time of the activities. By delaying the dispatch of the activities, average power consumption on multi-threading processors may be reduced.

Although the present invention has been described with reference to specific exemplary embodiments, it will be evident that various modifications and changes may be made to these embodiments without departing from the broader spirit and scope of the invention as set forth in the claims. For example, although processors supporting Hyper-Threading Technology are described in the examples, other multi-threading processors may also be used. For another example, although the techniques have been described in connection with activities and threads, the techniques may also be used in other applications to increase processor idle time. Accordingly, the specification and drawings are to be regarded in an illustrative rather than a restrictive sense.

What is claimed is:

1. A method, comprising:
    determining if there is an activity currently being executed by one of a plurality of execution units of a multi-threading system, the multi-threading system to execute a plurality of activities;
    dispatching a first activity to be executed by one of the plurality of execution units of the multi-threading system, along with the activity currently being executed, if it is determined that the activity is currently being executed;

scheduling the first activity to be executed by one of the plurality of execution units of the multi-threading system by storing the first activity in an activity dispatch buffer and delaying its dispatch for execution by an execution unit, if it is determined that the activity is not currently being executed, wherein the first activity is ready to be executed and the first activity is delayed from execution, to wait for a second activity to be dispatched for execution, when one or more execution units from the plurality of execution units are available to execute the first activity; and executing the first activity in an execution unit of the multi-threading system after its dispatch.

2. The method of claim 1, wherein the first activity and the second activity are dispatched together so that executions of the first activity and the second activity overlap.

3. The method of claim 2, wherein the first activity is associated with a first thread and the second activity is associated with a second thread.

4. The method of claim 1, further comprising:
dispatching the first activity after a predetermined period of delay.

5. The method of claim 1, further comprising:
dispatching the first activity if the first activity cannot be delayed.

6. The method of claim 1, further comprising:
determining if there is a third activity running and if so, dispatching the first activity so that executions of the first activity and the third activity overlap.

7. A method, comprising:
determining if one or more activities from a plurality of activities are being executed in a multi-threaded processor; and scheduling the plurality of activities for execution in a plurality of execution units of the multi-threaded processor, the execution of one or more activities from the plurality of activities by, if a second activity from the plurality of activities is running then dispatching to an execution unit of the multi-threaded processor a first activity from the plurality activities for execution where the first activity and second are running at the same time, else if a third activity from the plurality of activities is ready to be executed then dispatching both the first activity and the third activity for execution in execution units of the plurality of execution units, otherwise delaying the first activity from execution by the execution unit, the first activity is ready to be executed by the execution unit of the multithreaded processor and the execution unit is available to execute the first activity.

8. The method of claim 7, wherein the first activity is delayed from being dispatched until the third activity is ready to be dispatched.

9. The method of claim 7, wherein the first activity is delayed until expiration of a predetermined delay period.

10. The method of claim 9, wherein upon said expiration the first activity is dispatched even when the third activity is not ready to be dispatched.

11. The method of claim 7, wherein the first activity is delayed based on priority.

12. An apparatus, comprising:
a volatile memory device to queue ready-to-be dispatched for execution activities in a multi-threading system; and
a scheduler to
determine if there is an activity currently being executed by one of a plurality of execution units of the multi-threading system;
dispatch a first activity to be executed by a first execution unit from the plurality of execution units of the multi-threading system, along with the activity currently being executed, if it is determined that an activity is currently being executed;
schedule an execution of the first activity by storing the first activity in the volatile memory device and delaying dispatch of the first activity to the first execution unit from the plurality of execution units, if it is determined that an activity is not currently being executed by one of the plurality of execution units, wherein the first activity is ready to be executed and the first activity is delayed from execution to wait for a second activity to be dispatched to a second execution unit from the plurality of execution units for execution when the first execution unit is available to execute the first activity, and wherein the first activity and the second activity are dispatched together.

13. The apparatus of claim 12, wherein the scheduler delays the dispatch of the first activity for up to a predetermined period.

14. The apparatus of claim 12, wherein the scheduler delays the dispatch of the first activity unless a third activity is running.

15. A computer readable medium containing executable instructions which, when executed in a processing system, to cause the processing system to perform a method comprising:
determining if there is an activity currently being executed by the multi-threading system, the multi-threading system to execute a plurality of activities at a plurality of execution units of the multi-threading system; and
scheduling the multi-threaded system by dispatching, to a first execution unit from the plurality of execution units, a first activity from the plurality of activities if it is determined that a second activity is running in a second execution unit from the plurality of execution units, else dispatching the first activity to the first execution unit and the second activity to the second execution unit from the plurality of activities if the second activity is ready to be dispatched, otherwise delay execution of the first activity by storing the first activity in an activity dispatch buffer, wherein the first activity is ready to be executed and the first activity is delayed until the second activity is ready to be executed when the first execution unit is available to execute the first activity.

16. The computer readable medium of claim 15, wherein the first activity is delayed until a predetermined delay period expires.

17. The computer readable medium of claim 15, wherein the first activity is delayed unless it cannot be delayed.

* * * * *